United States Patent
Lubbers et al.

(10) Patent No.: US 7,840,751 B2
(45) Date of Patent: Nov. 23, 2010

(54) COMMAND QUEUE MANAGEMENT OF BACK WATERED REQUESTS

(75) Inventors: Clark Edward Lubbers, Colorado Springs, CO (US); Robert Michael Lester, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 538 days.

(21) Appl. No.: 11/771,595

(22) Filed: Jun. 29, 2007

(65) Prior Publication Data

US 2009/0006689 A1    Jan. 1, 2009

(51) Int. Cl.
*G06F 13/18*    (2006.01)
(52) U.S. Cl. ............... 711/112; 711/158; 711/E12.072; 711/E12.075; 710/39; 710/40; 710/52; 710/74
(58) Field of Classification Search ....................... None
See application file for complete search history.

(56) References Cited

U.S. PATENT DOCUMENTS

| 6,789,163 | B2 | 9/2004 | Fox et al. |
| 6,965,965 | B2 | 11/2005 | Espeseth et al. |
| 7,188,219 | B2 * | 3/2007 | Jeddeloh ..................... 711/154 |
| 2002/0124132 | A1 * | 9/2002 | Haines et al. ............... 711/112 |
| 2005/0125418 | A1 * | 6/2005 | Brewer et al. ................. 707/10 |
| 2005/0172084 | A1 * | 8/2005 | Jeddeloh ..................... 711/154 |
| 2007/0067562 | A1 * | 3/2007 | Ohsaki et al. ............... 711/113 |

\* cited by examiner

*Primary Examiner*—Reginald G Bragdon
*Assistant Examiner*—Daniel J Bernard
(74) *Attorney, Agent, or Firm*—McCarthy Law Group

(57) ABSTRACT

Apparatus and method for command queue management of back watered requests. A selected request is released from a command queue, and further release of requests from the queue is interrupted when a total number of subsequently completed requests reaches a predetermined threshold.

20 Claims, 4 Drawing Sheets

COMMAND QUEUE MANAGEMENT OF BACK WATERED REQUESTS

BACKGROUND

Data storage devices are used in a variety of applications to store and retrieve user data. The data are often stored to internal storage media, such as one or more rotatable discs accessed by an array of data transducers that are moved to different radii of the media to carry out I/O operations with tracks defined thereon.

Sort strategies can be used to promote the servicing of I/O requests in a particular radial vicinity of the media. While this can improve overall data throughput rates, some data requests can become undesirably delayed, or "back watered," as the locus of activity is moved away from the radial position of such requests.

Back watered requests thus remain pending for execution, but are bypassed in favor of other, more efficiently executable requests. From a host or controller point of view, however, back watered requests are generally indistinguishable from "lost" requests that were never successfully received by the device in the first place.

SUMMARY

Various embodiments of the present invention are generally directed to an apparatus and method for command queue management of back watered requests.

In accordance with various embodiments, a selected request is released from a command queue, and further release of requests from the queue is interrupted when a total number of subsequently completed requests reaches a predetermined threshold.

DETAILED DESCRIPTION

Figure 1:
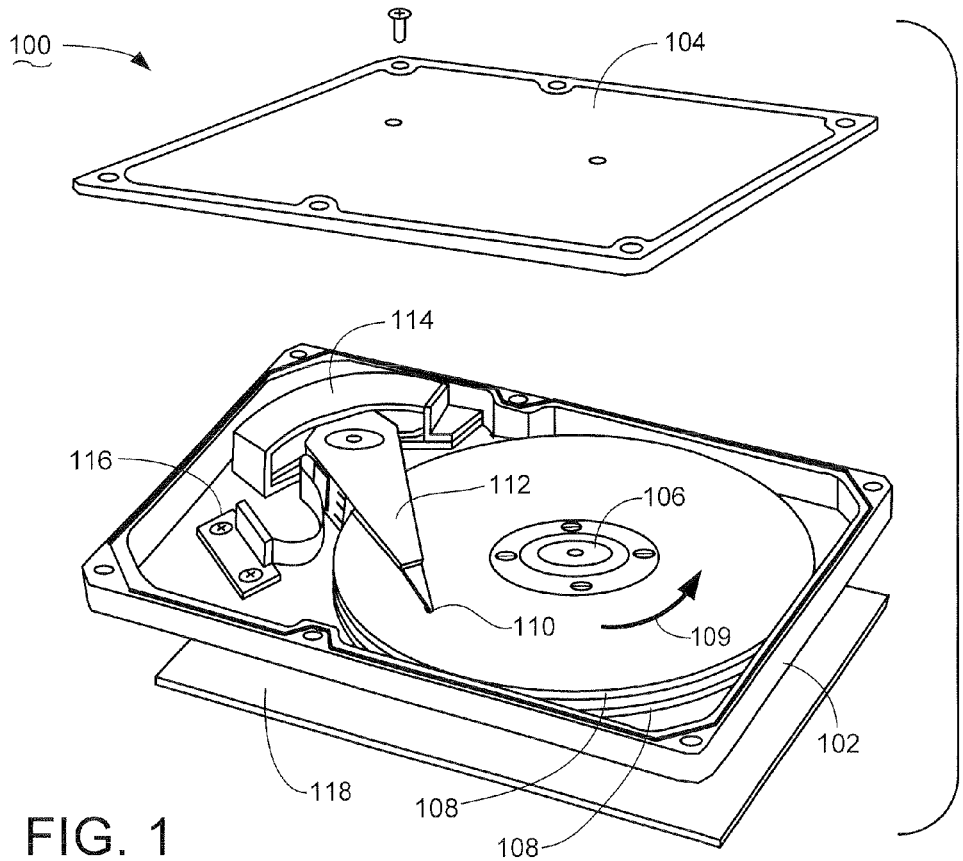
FIG. 1 shows an exemplary data storage device.

FIG. 1 shows an exemplary data storage device in accordance with various embodiments. The device is characterized as a hard disc drive of the type configured to store and transfer user data with a host device, although such is not limiting.

The device 100 includes a housing formed from a base deck 102 and top cover 104. An internally disposed spindle motor 106 is configured to rotate a number of storage media 108 in rotational direction 109. The media 108 are accessed by a corresponding array of data transducers (heads) 110 disposed adjacent the media to form a head-disc interface (HDI).

A head-stack assembly ("HSA" or "actuator") is shown at 112. The actuator 112 rotates through application of current to a voice coil motor (VCM) 114. Controlled operation of the VCM 114 causes the transducers 110 to align with tracks (not shown) defined on the media surfaces to store data thereto or retrieve data therefrom. A flex circuit assembly 116 provides electrical communication paths between the actuator 112 and device control electronics on an externally disposed printed circuit board (PCB) 118.

Figure 2:
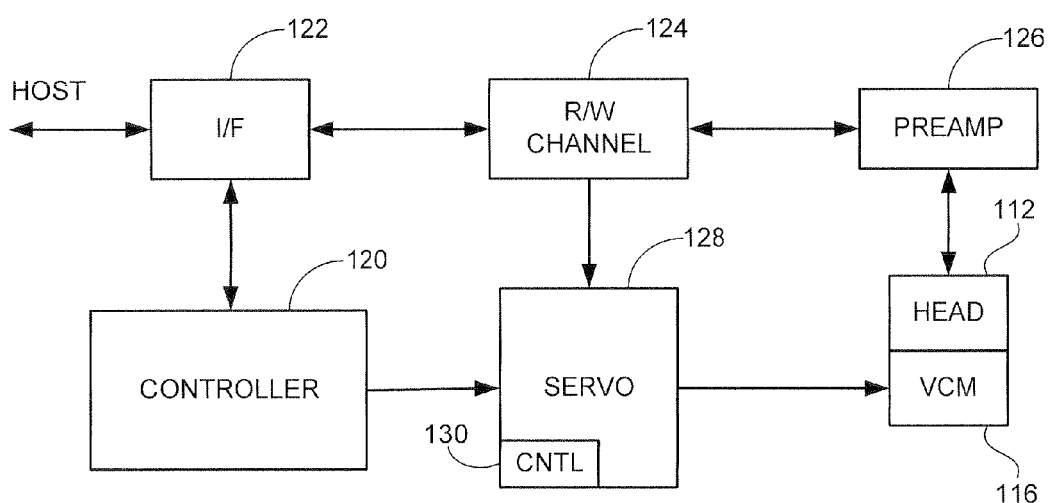
FIG. 2 is a functional representation of the device of FIG. 1.

FIG. 2 provides a generalized functional block diagram of the device 100 of FIG. 1. A top level controller 120 provides overall control of the device 100 during operation. An interface (I/F) circuit 122 communicates with an upstream device (not shown) to facilitate data I/O operations in which user data are transferred between the media 110 and the upstream device.

A read/write (R/W) channel 124 conditions write data to be written to the media 110, and reconstructs previously stored data from readback signals transduced from the media 110. A preamplifier/driver circuit (preamp) 126 applies write currents to the associated transducer 112 during write operations, and applies read bias currents to the transducers 112 and readback signal preamplification during read operations.

A servo circuit 128 provides closed loop servo actuator control using embedded servo data on the respective media surfaces. The servo circuit 128 preferably includes a programmable servo controller 130 which operates under the direction of the top level controller 120.

The servo controller 130 generally operates in two primary modes, seeking and track following. Seeking generally involves controlled radial movement of a selected transducer 112 from an initial position to a final, destination position. Track following generally comprises operation of the servo controller 130 to maintain the selected transducer 112 over the center (or other commanded position) a selected track in order to carry out data accesses with the track.

The top level controller 120 can concurrently process multiple received data access commands (I/O requests), and employs a command queue sort strategy to sequence the localized servicing of these commands in an efficient manner to maintain an overall high data throughput rate.

Figure 3:
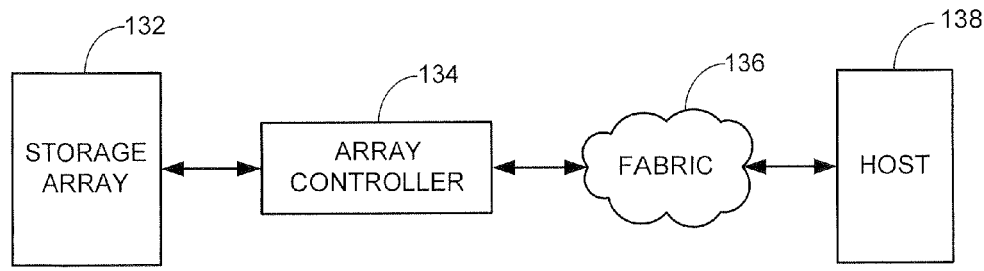
FIG. 3 sets forth a network system that incorporates the device of FIG. 1.

In some embodiments, the device 100 is incorporated into a multi-device data storage array 132, as shown in FIG. 3. The storage array 132 is made up of a plurality of such devices arranged into a larger memory space, such as in a selected RAID (redundant array of independent disks) configuration.

The storage array 132 is controlled by an array controller 134, which is provisioned with one or more processing cores to manage complex data I/O transactions with the array. While only a single array 132 and a single controller 134 are shown in FIG. 3, in a preferred embodiment redundant arrays and controllers arranged in parallel to enhance system reliability and availability.

The controller 134 communicates across a computer network, or fabric 136 to any number of host devices, such as exemplary host device 138. The fabric can take any suitable form, including the Internet, a local area network (LAN), etc. The host device 138 can be an individual personal computer (PC), a remote file server, etc.

Figure 4:
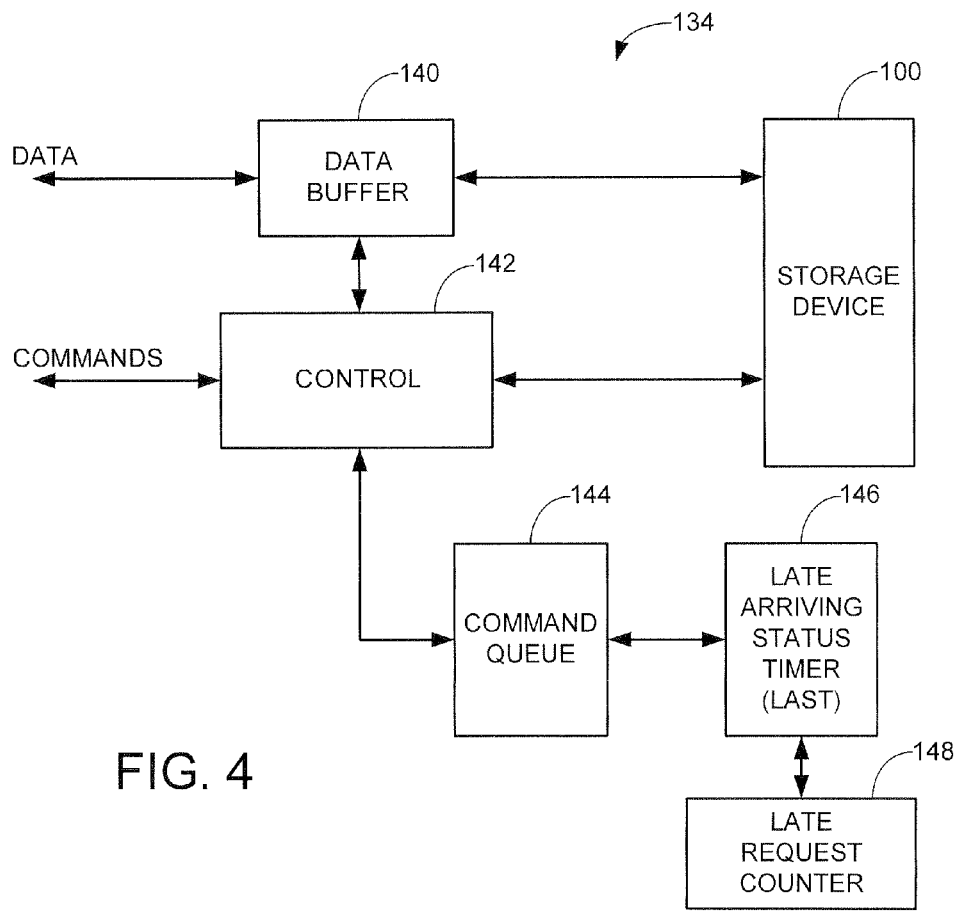
FIG. 4 provides an exemplary functional representation of the array controller of FIG. 3.

FIG. 4 depicts selected portions of the controller 134 in greater detail. A data buffer 140 serves as a cache memory to temporarily store data being transferred between the storage device 100 and the host device 138. Associated commands are received and processed by a control block 142 of the controller 134.

During a write operation in which write data are supplied by the host device 138 for storage to the array 132, the write data are temporarily transferred to the data buffer 140. An associated write command data I/O request is supplied to the control block 142, which places the request in a command queue 144 pending release of the request to the storage device 100.

Upon release, the write data are supplied to the device 100 along with the associated write request, and the device 100 schedules the writing of the data to the media 108 (FIG. 1). A request complete status is returned by the device 100 to indicate completion of the write request, either immediately (in a writeback mode) or after the actual completion of the writing of the data by the device 100 (non-writeback mode).

During a read operation in which previously stored data are requested by the host device 138, an associated read command data I/O request is supplied to the control block 142 and placed into the command queue 144. The control block 142 thereafter sends the associated read request to the device 100 for servicing. The readback data, once obtained, are transferred to the data buffer 140 and then across the fabric 136 to the initiating device 138.

If the requested data reside in a local device cache (e.g., a buffer of the I/F circuit 122, FIG. 2), a cache hit may occur in which case the data are immediately forwarded from the device 100 to the controller 134. The data may be resident in the local cache due to having previously been requested by the controller, or as a result of an independent speculative data retrieval operation by the device 100 based on the sequencing of previous requests.

If the requested data are not resident locally, a scheduled read operation will be performed by the device 100 to retrieve the data from the media 108. The device 100 adds the associated read request to its seek queue, and executes the request in due course.

It is contemplated that the command queue 144 in FIG. 4 has the capability of managing up to a selected number N of pending data access requests (commands), such as 16 requests. Although not limiting, the command queue 144 preferably accommodates all standard priority (e.g., level 0) requests, with higher priority requests (e.g., level 1, etc.) receiving promoted treatment regardless of the then-existing queue depth. Cache hits for requested data already resident in the buffer 140 are satisfied immediately, so such read requests do not reach the command queue 144.

Received requests that require storage device 100 interaction are placed by the control block 142 into available slots in the command queue 144. Exemplary command queue slots are denoted as $X_0$ to $X_{15}$ in FIG. 5. The requests are selectively forwarded (released) from the queue 144 to the device 100 at a rate and in an order deemed suitable by the control block 142 to promote data transfer efficiencies.

Preferably, a released request remains in its associated slot in the command queue 144 until a request complete status is received from the device 100 for that request, indicating that the device has completed execution of the request. At that point, the completed request is cleared from the queue, making that slot available to receive a new request. Alternatively, released requests may be accumulated in a separate queue or other memory structure pending completion.

During periods of relatively high host I/O activity levels, the command queue 144 may become full; that is, the queue depth may reach 16 or whatever other maximum capacity N is provided for the queue. In such case, the control block 142 will accumulate and hold back additional commands received from the host 138 until additional slots become available in the command queue 144.

In accordance with various embodiments, a late arriving status timer (LAST) 146 and a late request counter 148 are provided in conjunction with the command queue 144. The LAST 146 is a byte array that is preferably cache line aligned with the various slots of the command queue 144, and the late request counter 148 is incrementally set in relation to the LAST 146.

Figure 5:
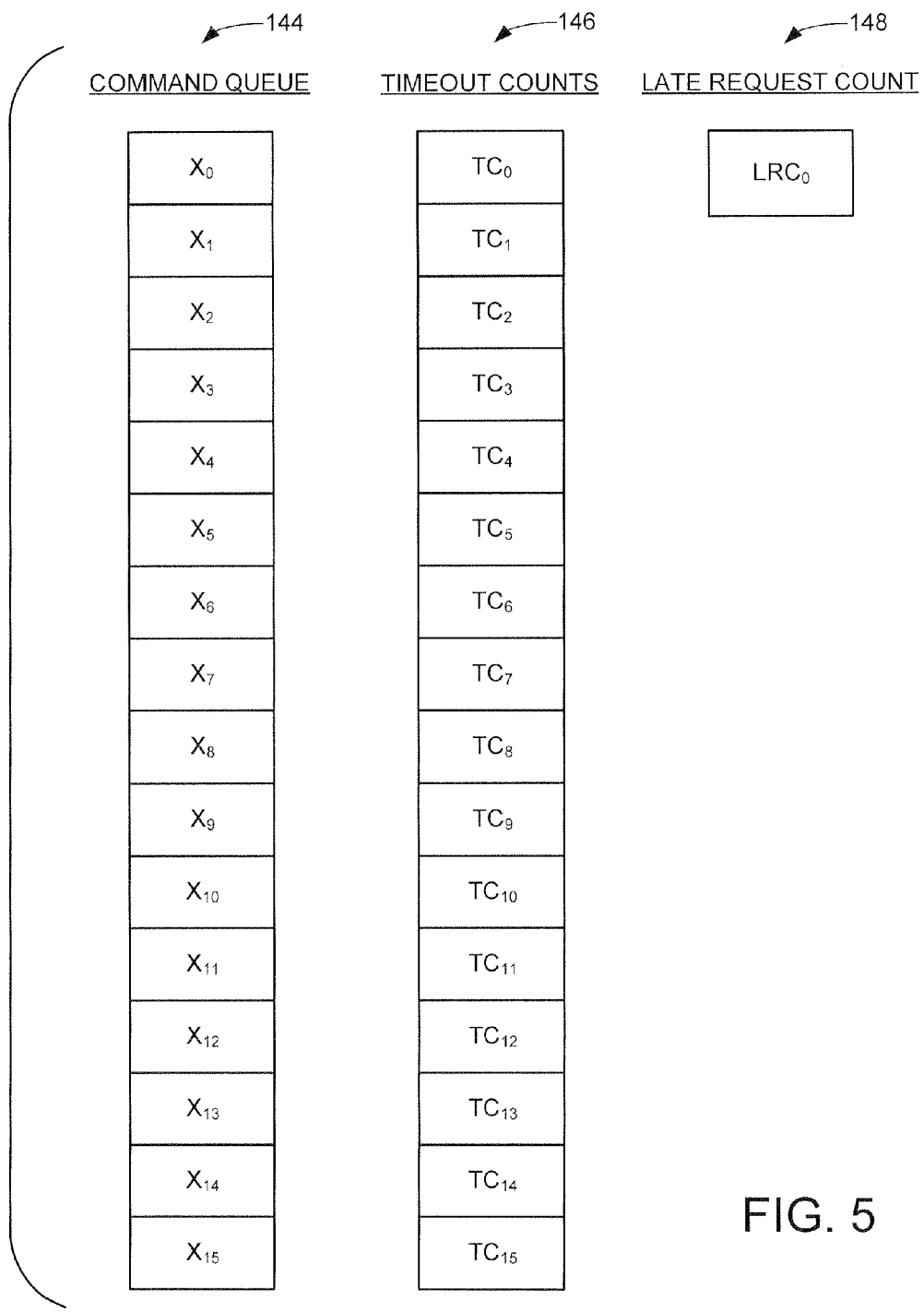
FIG. 5 generally depicts portions of the circuitry of FIG. 4 in greater detail.

As shown in FIG. 5, the LAST 146 is configured to store timeout counts $TC_0$ to $TC_{15}$, with each count being associated with a corresponding slot of the command queue 144. the late request counter 148 maintains a late request count ($LRC_0$, FIG. 5) that is selectively adjusted in relation to the values of the timeout counts TC. The release of requests from the command queue 144 to the device 100 is temporarily interrupted, or resumed, in relation to the LRC value setting.

Generally, the circuitry of FIG. 4 operates to reduce the occurrence of "back watered" requests. A back watered request is a request that has been successfully forwarded for execution, but encounters an unacceptable amount of delay (e.g., by being pushed to the back of the seek queue, etc.) due to the promotion of other, later issued requests. The circuitry of FIG. 4 further enables the controller 134 to discern between back watered requests and lost requests; that is, requests that were lost and thus are not pending execution by the device at all. Such lost requests can arise, for example, due to an error in the transmission of a command request packet.

The controller 134 of FIG. 4 generally operates as follows. Each time the control block 142 sends a request from the command queue 144 to the device 100, an associated TC value is entered into the LAST 146 for that request. Whenever the control block 142 receives a request complete status back from the device 100, the associated TC value for the completed request in the LAST 146 is checked. If the TC value is zero (or some other selected threshold value), the late request count ($LRC_0$) value is decremented by one count.

The TC value for the completed request is then preferably set unconditionally to zero and the completed request is cleared from the queue 144 (i.e., the associated slot is made available to receive a new request). Each of the TC values in the LAST 146 for the remaining, pending requests are also decremented by one count. The LRC value is incremented by one count for each decremented TC value that becomes zero. When the LRC value becomes non-zero, no more requests will be issued to the device 100, and this interrupt condition is maintained until the LRC value is returned to zero.

The foregoing operation advantageously limits the device queue when necessary to prevent any selected request from being delayed too long by requests subsequently issued to the device 100. The tracking is thus event driven rather than elapsed time driven, and is based on a measure of the number of requests that have been processed since the issuance of the selected request.

Figure 6:
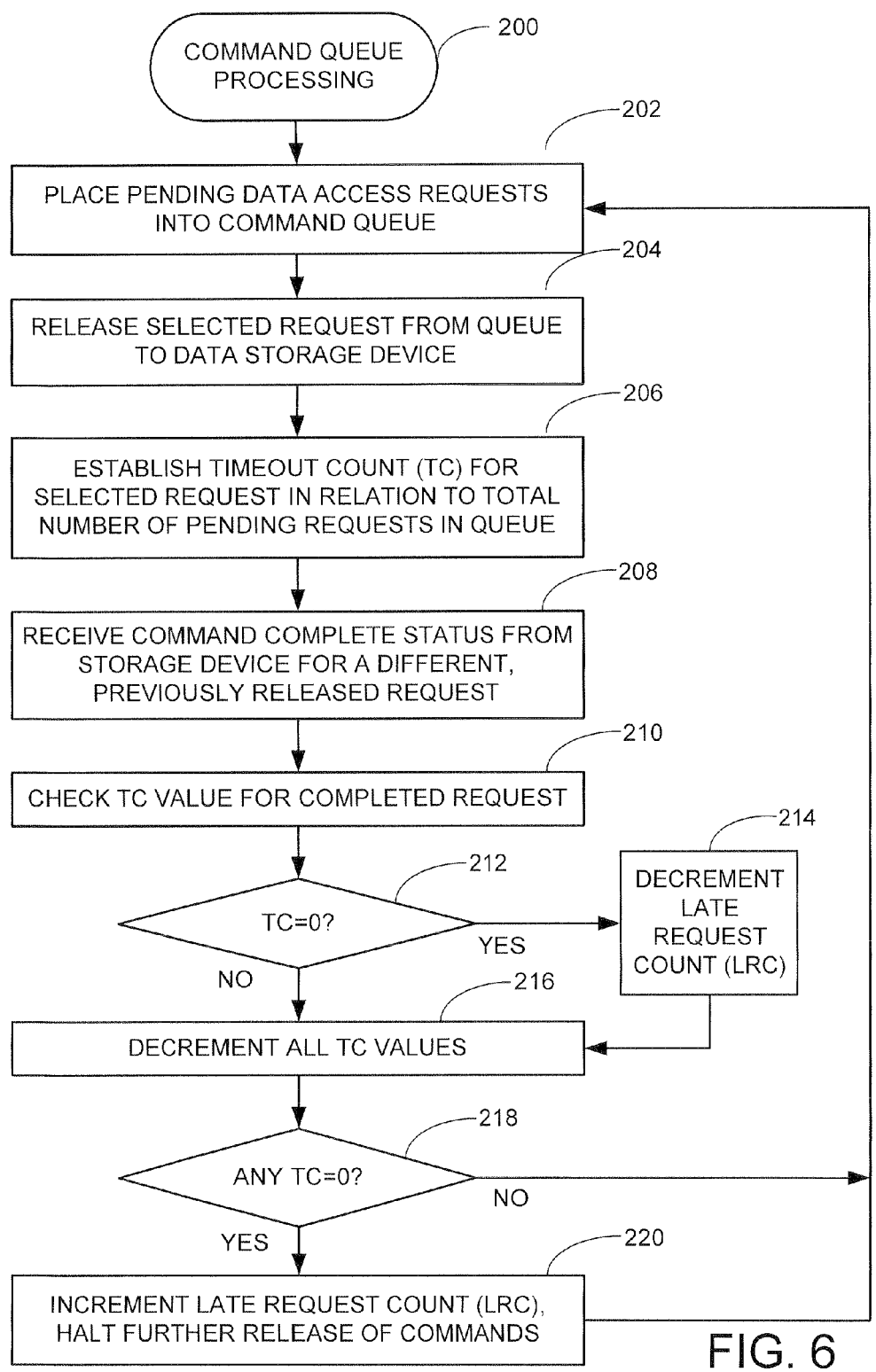
FIG. 6 is a flow chart for a COMMAND QUEUE PROCESSING routine generally representative of steps carried out in accordance with various embodiments of the present invention.

FIG. 6 provides a flow chart for a COMMAND QUEUE PROCESSING routine 200 to set forth the above operation in greater detail. While the routine 200 sets forth exemplary operation of the controller 134, such is not limiting; the routine 200 can be alternatively carried out in other environments, such as by the storage device 100 of FIGS. 1-2, alone or incorporated into an array such as 132, and with or without an associated controller such as 134.

At step 202, pending data access requests (commands) are initially placed into the command queue 144 by the control block 142. Such requests may be continuously placed into the command queue 144 at various times throughout the routine, with the rate of introduction of new commands varying in relation to the transactional loading requirements of the host 138. The corresponding queue depth can thus range anywhere from 0 to 16, with requests remaining in the queue until cleared.

At step 204, the control block 142 operates to select one of the then-pending commands in the command queue 144 for release to the storage device 100. For purposes of illustration, it is contemplated that the request released for execution is slotted at slot $X_3$ in FIG. 5. The request at slot $X_3$ is further contemplated as a read command to read a selected amount of data from the device 100 at an associated location of the media 108 (FIG. 1), although it will be noted that the same processing is preferably applied to write commands.

At step 206, the control block 142 operates to assign an associated timeout count $TC_3$ (FIG. 5) for the just-released command. In a preferred embodiment, the TC value is selected in relation to the total number of pending commands in the queue 144. For example, the count value TC can be a combination of the number of pending commands $N_{PC}$ and a delta value $\Delta$, such as:

$$TC=N_{PC}+\Delta \tag{1}$$

where $\Delta$ is a suitable value, such as 16. Hence, if five (5) commands are pending in the command queue 144 at the time of release of command $X_3$ in step 204, the associate value in the LAST 146 is set to $TC_3=5+16=21$ in step 206. In this way, the TC is initially set for a released request in relation to the then-existing operational transaction loading level, with increasingly larger TC values given in the presence of deeper queue depths.

Alternatively, the TC can be set to a selected level irrespective of the existing queue depth, such as TC=16 (or some other value) each time. In another embodiment, ranges of TC values can be used, such as a first value for a range of lower queue depths, a second value for a range of higher queue depths, and so on. Different set TC values, or $\Delta$ values, can be used for read requests versus write requests. The control block 142 can further adaptively adjust the initially assigned TC values over time to optimize performance.

The operation of steps 204 and 206 will repetitively occur throughout the operation of the routine 200. Each time that a queued command is released to the storage device 100, an associated TC value will be provided to the LAST 146 in the associated location.

Step 208 in FIG. 6 next depicts the receipt of a request complete status from the device 100. For purposes of the present discussion, it is contemplated that at this point, the received request complete status is associated with the request at slot $X_7$ in FIG. 5. As before, such statuses will be reported periodically throughout the routine.

The associated T C value for the completed request ($TC_7$, FIG. 5) is evaluated at step 210. As shown by decision step 212, if the TC value is equal to zero, the flow continues to step 214 where the $LRC_0$ value (FIG. 5) of the late request counter 146 is decremented by one count. It will be noted that if the $LRC_0$ value is already zero prior to step 214, the value preferably remains so after the operation of step 214.

At step 216, all of the remaining TC values in the LAST 146 are similarly decremented by one count. As shown by decision step 218, if all of the decremented TC values are non-zero, the routine returns back to step 202 and continues operation as before.

On the other hand, if at least one of the decremented TC values reaches zero, the flow continues to step 220 where the $LRC_0$ value is incremented by a number of counts equal to the number of zero TC values. Further release of requests is also halted during this step, and remains so until the $LRC_0$ value is returned to zero.

While the metering of additional requests to the device 100 is temporarily halted, the controller 134 can take any number of suitable actions depending on the circumstances. For example, during periods of high activity the controller 134 can wait a selected, relatively short time interval to see if the remaining outstanding requests will proceed to be completed in due course. The controller 134 can alternatively, or additionally, send a status inquiry to the device 100, resend the outstanding request, etc.

The maximum latency for any issued request will generally be a function of a number of factors, including factors relating to known device behavior. An exemplary maximum latency for a full queue (TC of 32) would be in the neighborhood of around 32*4=128 milliseconds, ms ($128\times10^{-3}$ seconds). This assumes an average of one media revolution per request (at 15,000 revolutions per minute, rpm) and no extensive error recovery being enacted. However, it is contemplated that the routine 200 may provide much improved performance than this level.

For a single outstanding request of moderate length, the expected completion interval may be on the order of perhaps at most two media revolutions, or around 8 milliseconds, ms ($8\times10^{-3}$ seconds). Data recovery efforts may extend this up to a larger value, such as on the order of up to about 1 second. This compares favorably to standard RAID controller I/O overall elapsed time timeout values, that may typically be on the order of 10 seconds or more. Thus, the operation of step 220 can be adaptively adjusted in relation to the type of request (e.g., a read command or write command), the current queue depth, and any other information such as the setting of a short error recovery flag. An exemplary range for the controller to wait thus may be on the order of as few as 20 ms to up to around 1 second.

If at the end of this delay period, a get-next-in-queue SCSI command may be issued to determine whether the request is lost, or just taking a while to process by the device 100. In the latter case, the status inquiry can result in the resetting of a larger timeout value.

The routine of FIG. 6 advantageously uses the value zero for both the timeout counts TC and the late request count LRC, and respectively adjusts these values on an integer-basis (e.g., TC counts down as 16, 15, 14, etc.; LRC is normally 0 but incremented 1, 2, etc.). It will be appreciated, however, that any suitable predetermined values, or thresholds, can be arbitrarily selected based on the requirements of a given application.

While exemplary embodiments have been set forth in the environment of a hard disc drive data storage device, it will be appreciated that the foregoing embodiments can be adapted for use in any number of suitable environments For purposes of the appended claims, the terms "increment," "decrement" and the like will be understood broadly to signify generalized adjustments in value without necessarily referencing a specific direction of increase and/or decrease in magnitude.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising:
    releasing a selected request from a command queue and selectively interrupting further release of requests from the command queue by establishing a timeout count upon the release of the selected request; and decrementing the timeout count in response to a request complete status being communicated for another request released from the queue, said timeout count decremented by one count for each said communicated request complete status and independently of elapsed time, wherein the timeout count is first established in relation to a number of pending requests in the command queue when the selected request is released.

2. The method of claim 1, wherein the selected request comprises a command to transfer data between a first memory and a second memory.

3. The method of claim 1, further comprising providing the command queue with N slots, each slot accommodating a different pending request, and a byte array with a corresponding number of N entries, each entry associated with a corresponding one of the slots of the command queue, wherein the releasing and selectively interrupting step comprises writing the timeout count to the corresponding entry of the byte array associated with the selected request.

4. The method of claim 1, wherein the releasing step further comprises releasing a plurality of requests from the command queue and assigning a corresponding timeout count to each to form a corresponding plurality of timeout counts, and wherein the method further comprises decrementing each of the plurality of timeout counts each time a request complete status is received associated with another issued request.

5. The method of claim 1, further comprising resuming further release of requests from the command queue after the releasing and selectively interrupting step upon notification that an execution of the selected request has been completed, and clearing the completed selected request from the command queue so that a new request can be added to the command queue in place of the completed selected request.

6. An apparatus comprising a control block and an associated command queue, the control block configured to release a selected request from the command queue, to establish a timeout count upon the release of the selected request that is defined in relation to a number of pending requests in the queue when the selected request is released, to decrement the timeout count for each request complete status that is communicated for other released requests, and to interrupt further release of both read and write requests from the command queue in relation to the timeout count decrementing to a predetermined threshold.

7. The apparatus of claim 6, wherein the selected request comprises a command to transfer data between a first memory and a second memory.

8. The apparatus of claim 6, wherein the control block releases the selected request by forwarding the selected request to a data storage device to write data to or read data from a memory of the device, and wherein the device returns the request complete status to the control block upon completion of execution of the selected request by the data storage device.

9. The apparatus of claim 6, wherein the apparatus further comprises a late request counter which maintains a late request count that is incremented when the timeout count reaches the predetermined threshold.

10. The apparatus of claim 6, wherein the control block is configured to release a plurality of requests from the command queue, to assign a corresponding timeout count to each of the plurality of requests to form a corresponding plurality of timeout counts, and to decrement each of the plurality of timeout counts each time a request complete status is received indicating that another issued request has been completed.

11. The apparatus of claim 6, wherein the command queue comprises N slots, each slot accommodating a different pending request, and a byte array with a corresponding number of N entries, each entry associated with a corresponding one of the slots of the command queue, the control block placing a timeout count in the corresponding entry of the byte array associated with the selected request.

12. An apparatus comprising:
a control block and an associated command queue, the control block configured to release a selected request from the command queue and to interrupt further release of requests from the command queue, wherein the command queue comprises N slots, each slot accommodating a different pending request; and
a byte array with a corresponding number of N entries, each entry associated with a corresponding one of the slots of the command queue, and wherein the control block places a timeout count in the corresponding entry of the byte array associated with the selected request.

13. The apparatus of claim 12, wherein the timeout count is defined in relation to a number of pending requests in the command queue when the selected request is released.

14. The apparatus of claim 13, wherein the timeout count is defined in relation to a total number of pending requests in the command queue when the selected request is released plus a predetermined constant value.

15. The apparatus of claim 12, wherein the control block is configured to interrupt further release of the requests from the command queue by decrementing the timeout count for each request complete status that is communicated for other released requests.

16. The apparatus of claim 15, wherein the control block is configured to interrupt further release of the requests from the command queue by decrementing the timeout count to a predetermined threshold before a request complete status is communicated corresponding to the release of the selected request.

17. The apparatus of claim 16, wherein comprising a late request counter that maintains a late request count that is incremented when the timeout count is decremented to the predetermined threshold.

18. The apparatus of claim 12, wherein the selected request comprises a command to transfer data between a first memory and a different second memory.

19. The apparatus of claim 18, wherein the second memory resides in a data storage device, and wherein the data storage device returns the request complete status to the control block in relation to completing an execution of the selected request by the data storage device.

20. The apparatus of claim 12, wherein the control block is configured to release a plurality of requests from the command queue, to assign a corresponding timeout count to each of the plurality of requests to form a corresponding plurality of timeout counts, and to decrement each of the plurality of timeout counts each time a request complete status is received indicating that another issued request has been completed.

* * * * *